(12) United States Patent
Fender

(10) Patent No.: US 9,084,414 B1
(45) Date of Patent: Jul. 21, 2015

(54) DEVICE FOR AIDING A USER IN THREADING A FISH HOOK

(76) Inventor: Kevin A. Fender, Heltonville, IN (US)

(*) Notice: Subject to any disclaimer, the term of this patent is extended or adjusted under 35 U.S.C. 154(b) by 231 days.

(21) Appl. No.: 13/604,597

(22) Filed: Sep. 5, 2012

(51) Int. Cl.
*A01K 97/06* (2006.01)
*A01K 91/04* (2006.01)

(52) U.S. Cl.
CPC .............. *A01K 97/06* (2013.01); *A01K 91/04* (2013.01)

(58) Field of Classification Search
USPC ........ 43/4, 57.1, 43.16; 223/99; 112/222–225
See application file for complete search history.

(56) References Cited

U.S. PATENT DOCUMENTS

| | | | |
|---|---|---|---|
| 1,755,903 A | 4/1930 | Townsend | |
| 2,371,517 A | 3/1945 | Groulx | |
| 2,497,188 A | 2/1950 | Schindler | |
| 2,501,425 A | 3/1950 | Valentine | |
| 2,636,309 A | 4/1953 | Randall | |
| 2,724,208 A | 11/1955 | Nelson | |
| 4,468,882 A | 9/1984 | Marusak | |
| 5,501,030 A | 3/1996 | Markle, Jr. | |
| 6,625,921 B2 | 9/2003 | Friederichs, III | |
| 7,168,202 B2 | 1/2007 | Kohler | |
| 7,793,458 B2 * | 9/2010 | Eisbrenner | 43/44.83 |

* cited by examiner

*Primary Examiner* — Darren W Ark
*Assistant Examiner* — Marc Burgess
(74) *Attorney, Agent, or Firm* — Richard L. Miller

(57) ABSTRACT

An aid for threading at least one fishing line through at least one fish hook, respectively. The aid includes a body, at least one clip, and at least one threader. The at least one clip depends from the body, and is for replaceably holding the at least one fish hook, respectively. The at least one threader is operatively connected to the body, and is for guiding the at least one fishing line through the at least one fish hook, respectively, so as to aid threading the at least one fishing line through the at least one fish hook, respectively.

25 Claims, 6 Drawing Sheets

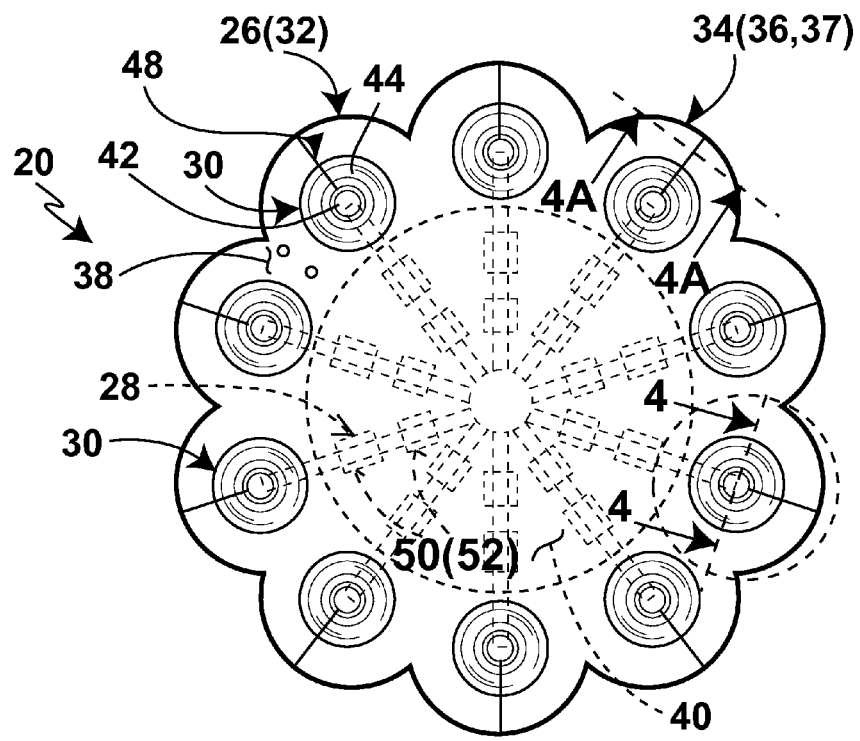
FIG. 3
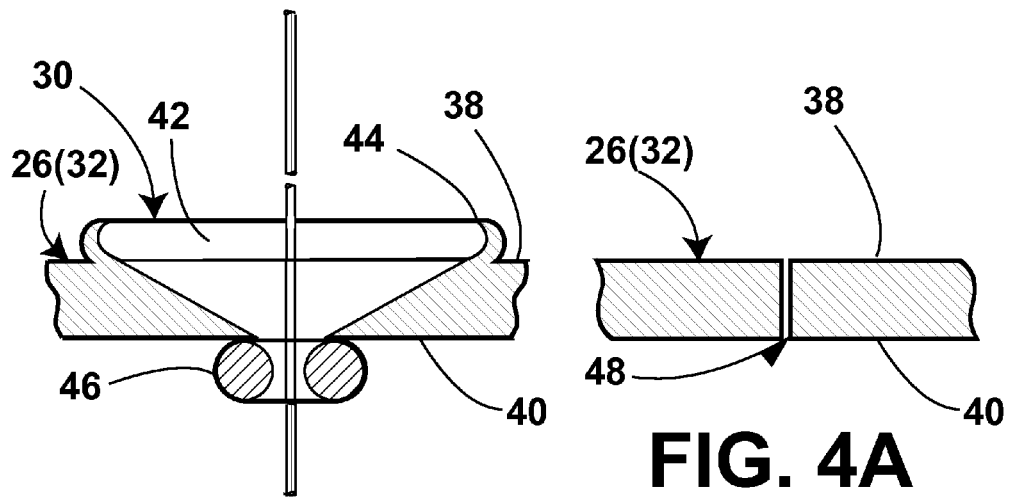
FIG. 4  FIG. 4A

DEVICE FOR AIDING A USER IN THREADING A FISH HOOK

1. BACKGROUND OF THE INVENTION

A. Field of the Invention

The embodiments of the present invention relate to an aid, and more particularly, the embodiments of the present invention relate to an aid for threading at least one fishing line through at least one fish hook, respectively.

B. Description of the Prior Art

Numerous innovations for fish hook holders have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach an aid for threading at least one fishing line through at least one fish hook, respectively.

(1) U.S. Pat. No. 1,755,903 to Townsend.

U.S. Pat. No. 1,755,903 issued to Townsend on Apr. 22, 1930 in U.S. class 43 and subclass 57.1 teaches a fish hook holder including a rectangular rigid block of relatively soft material, and a plurality of cut away portions disposed around the sides of the block. The cut away portions are adapted to receive therein the shanks of a plurality of fish hooks with the points embedded in the block.

(2) U.S. Pat. No. 2,371,517 to Groulx.

U.S. Pat. No. 2,371,517 issued to Groulx on Mar. 13, 1945 in U.S. class 43 and subclass 57.1 teaches a holder for a plurality of fish hooks. The holder includes two flat sheets of hard flexible material in face engagement with each other throughout their area. Securing members attach the sheets together at transverse and longitudinally spaced points and forming apparatus whereby spaced, substantially parallel hook receiving pockets, open at both ends, are formed when hooks are forced between the sheets between the securing points. The flexible sheets flex outwardly from each other transversely of the sheets between the securing points to conform to the thickness of the hooks and to grip the main body of the hook when the hooks are forced into the pockets.

(3) U.S. Pat. No. 2,497,188 to Schindler.

U.S. Pat. No. 2,497,188 issued to Schindler on Feb. 14, 1950 in U.S. class 43 and subclass 57.2 teaches a fish hook holder including a thin-walled rectangular back having at each end a folded over portion providing an offset flange at each end of the block. The back has spaced-apart apertures therein between the flanges. A wire having U-shaped eyes therein is secured to the back with the eyes extending through respective apertures in the back. A pair of resilient material is disposed on the back with its ends secured between the back and the offset flanges.

(4) U.S. Pat. No. 2,501,425 to Valentine.

U.S. Pat. No. 2,501,425 issued to Valentine on Mar. 21, 1950 in U.S. class 43 and subclass 57.1 teaches a fish hook holder including a pair of members connected with each other for relative movement therebetween and having adjacent cooperating surface portions. The portion of one of the members is formed with a series of spaced recesses each providing between the portions an aperture opening continuously to the outside of the holder and of sufficient size to receive and hold the bent portion of a fish hook intermediate its shank and barbed point with its shank extending outside the holder but too small in size to pass the barbed point of the hook. The portion of the other members is formed with a recess adapted by relative movement between the members to be registered with one of the series of recesses of the first mentioned member to afford therewith an enlarged opening of sufficient size to permit the insertion and removal of the barbed point of the hook.

(5) U.S. Pat. No. 2,636,309 to Randall.

U.S. Pat. No. 2,636,309 issued to Randall on Apr. 28, 1953 in U.S. class 43 and subclass 57.2 teaches a fish hook and leader holder including a housing having an arcuate surface portion, a corresponding arcuate slide member slidably mounted on the arcuate surface portion. A plurality of hook elements are carried by the slide member and are adapted to be engaged by loop ends of leaders. The housing has openings for receiving the hook portions of fish hooks carried by the leaders. An apparatus slides the slide member to tension the leaders.

(6) U.S. Pat. No. 2,724,208 to Nelson.

U.S. Pat. No. 2,724,208 issued to Nelson on Nov. 22, 19955 in U.S. class 43 and subclass 57.1 teaches a container for snelled fish hooks, which has a rigid bottom, end and side walls, and a cover member normally closing the container. A pair of parallel, aligned cross bars are within the container dividing the same into three substantially equally sized compartments. The cross bars are of less height than the side walls and extend between the side walls, and having cylindrical bores extending therethrough in a direction transverse to the longitudinal extent of the bars adapted to receive the snells of fish hooks and loops disposed in the opposite ends of the container. The cross bars are formed with slits through the top edge thereof connecting with the bores. The slits are disposed in angular relation to the transverse plane of the bars whereby each snell must be angularly bent between its hook and loop to enter the slits and hence the bores. Flexible transparent covers are for the two end compartments. Hinges are at opposite ends of the compartment. Each hinge mounts a cover for swinging movement longitudinally of the container. The free end of each cover extends beyond the inner edge of its adjacent cross bar. An upright member is adjacent each cross bar on its inner side at an end thereof. A notch is in the outer side of each upright member and is adapted to be engaged by the free edge of its adjacent cover, whereby pressure exerted longitudinally on the inner edge of a cover will flex the same to release the edge from engagement with its associated notch, to free the cover for swinging movement about its hinge to open its associated compartment. Each cover, when in closed position, closely overlies the slits in its associated cross bar to close the same against egress of snells contained therein.

(7) U.S. Pat. No. 4,468,882 to Marusak.

U.S. Pat. No. 4,468,882 issued to Marusak on Sep. 4, 1984 in U.S. class 43 and subclass 57.1 teaches a fish hook holder including a base member having a first planar surface with a series of flat recesses therein which open to a first edge of the base. A cover is bonded to the base to form hook retaining compartments in the recesses. The hooks fit snugly between the floors of the respective recesses and the cover and are retained by resilient nubs extending above the floors. A protected line severing blade may be provided in one end of the holder, which is shaped like a fish for convenience in packaging and use.

(8) U.S. Pat. No. 5,501,030 to Markle, Jr.

U.S. Pat. No. 5,501,030 issued to Markle, Jr. on Mar. 26, 1996 in U.S. class 43 and subclass 57.1 teaches a device for conveniently holding or storing snelled hooks, which does not utilize mechanical means of any kind. The device includes an elongated, substantially tubular shaped member, the interior of which is subdivided into a plurality of individual hollow compartments, each of which are of a size to accommodate a leader of a snelled hook and, in the preferred embodiment, the point of at least one snelled hook. In practice, the user of the device will insert a fish hook's leader into an inner tubular compartment and the points of the hook into the ends of nearby tubular compartment. The ends of the holder can be covered to thereby store a snelled hook therein.

(9) U.S. Pat. No. 7,168,202 to Kohler.

U.S. Pat. No. 7,168,202 issued to Kohler on Jan. 30, 2007 in U.S. class 43 and subclass 25.2 teaches a hook holder for a hook, especially a fish hook, having a shank and one or more curved end (portions) extending from the shank. The hook holder includes a container part provided with a cavity for accommodating the curved end portions of the hook, and a container opening through which the curved end portions of the hook are insertable into the cavity. The hook holder further includes retaining apparatus to prevent the hook's curved end portions from unintentionally leaving the container part. The retaining apparatus includes a cover part provided with a cover opening and mounted on the container part so as to be movable between a first position, in which the container opening is accessible through the cover opening to allow insertion of the curved end portions of the hook, and a second position, in which the container opening is closed by the cover part to allow the hook shank to project out of the hook holder through the container opening and the cover opening, and the curved end portions are prevented from leaving of the container part. The hook holder set has a storage unit and a plurality of hook holders.

It is apparent that numerous innovations for fish hook holders have been provided in the prior art, which are adapted to be used. Furthermore, even though these innovations may be suitable for the specific individual purposes to which they address, nevertheless, they would not be suitable for the purposes of the embodiments of the present invention as heretofore described, namely, an aid for threading at least one fishing line through at least one fish hook, respectively.

2. SUMMARY OF THE INVENTION

Thus, an object of the embodiments of the present invention is to provide an aid for threading at least one fishing line through at least one fish hook, respectively, which avoids the disadvantages of the prior art.

Briefly stated, another object of the embodiments of the present invention is to provide an aid for threading at least one fishing line through at least one fish hook, respectively. The aid includes a body, at least one clip, and at least one threader. The at least one clip depends from the body, and is for replaceably holding the at least one fish hook, respectively. The at least one threader is operatively connected to the body, and is for guiding the at least one fishing line through the at least one fish hook, respectively, so as to aid threading the at least one fishing line through the at least one fish hook, respectively.

The novel features considered characteristic of the embodiments of the present invention are set forth in the appended claims. The embodiments of the present invention themselves, however, both as to their constriction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIG. 3 is an enlarged diagrammatic top plan view of the aid of the embodiments of the present invention taken in the direction of ARROW 3 in FIG. 2;

FIG. 4 is an enlarged diagrammatic cross sectional view taken along LINE 4-4 in FIG. 3 of one portion of the at least one threader of the aid of the embodiments of the present invention;

FIG. 4A is an enlarged diagrammatic cross sectional view taken along LINE 4A-4A in FIG. 3 of a remaining portion of the at least one threader of the aid of the embodiments of the present invention;

4. LIST OF REFERENCE NUMERALS UTILIZED IN THE FIGURES OF THE DRAWING

Figure 1:
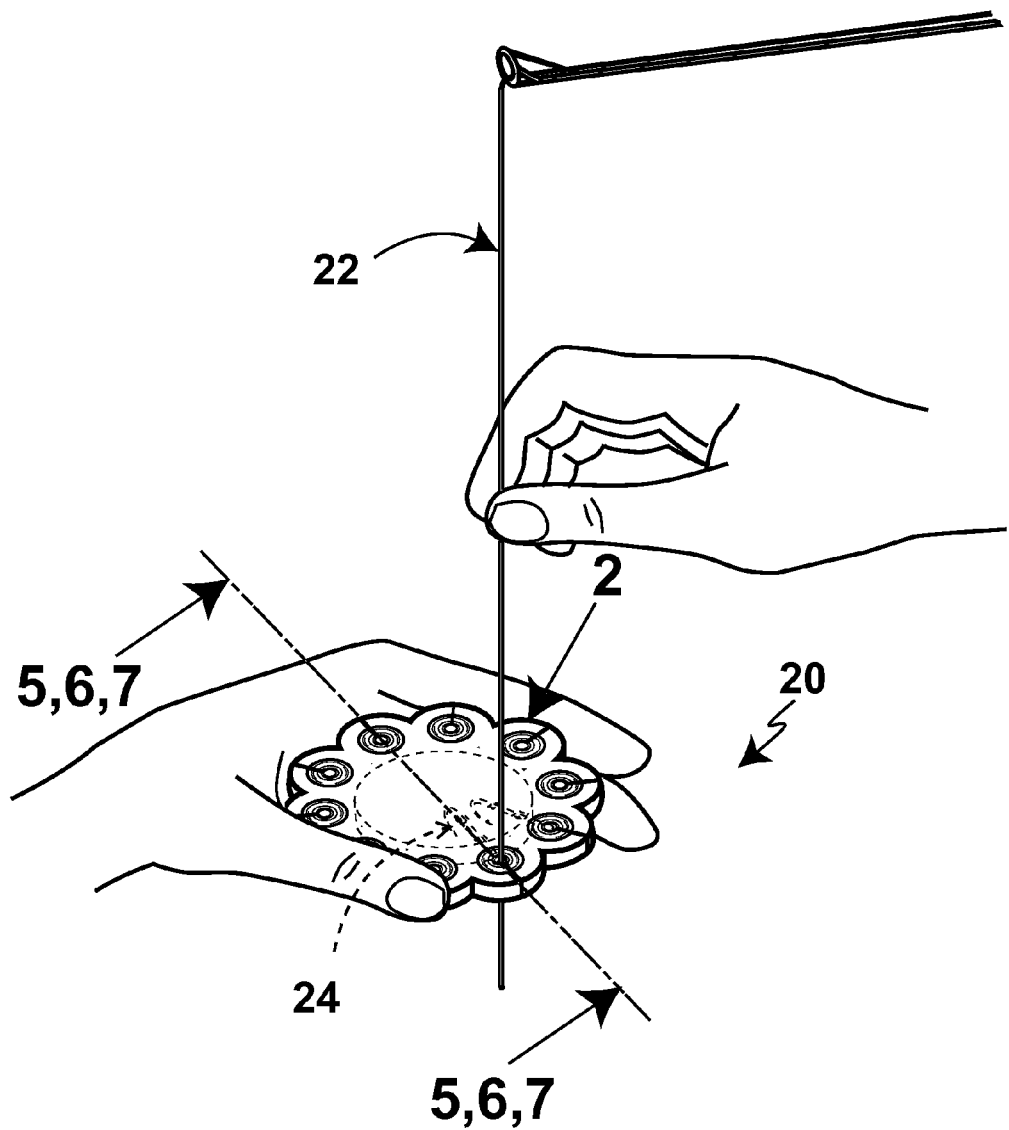
FIG. 1 is a diagrammatic perspective view of the aid of the embodiments of the present invention threading at least one fishing line through at least one fish hook, respectively.

A. Introductory 20 aid of embodiments of present invention for threading at least one fishing line 22 through at least one fish hook 24, respectively
22 at least one fishing line
24 at least one fish hook

B. Overall Configuration of Aid 20

26 body
28 at least one clip for replaceably holding at least one fish hook 24
30 at least one threader for guiding at least one fishing line 22 through at least one fish hook 24, respectively, so as to thread at least one fishing line 22 through at least one fish hook 24, respectively.

C. Specific Configuration of the Body 26

32 disk of body 26
34 periphery of disk 32 of body 26
36 scalloped periphery of periphery 34 of disk 32 of body 26
37 series of small curves of scalloped periphery 36 of periphery 34 of disk 32 of body 26
38 upper surface of disk 32 of body 26
40 lower surface of disk 32 of body 26

D. Specific Configuration of at Least One Threader 30

42 at least one through bore of disk 32 of body 26 for having at least one fishing line 22, respectively, pass therethrough during threading 44 at least one upper rim of at least one through bore 42 of disk 32 of body 26, respectively, for facilitating entering at least one fishing line 22 through at least one through bore 42 of disk 32 of body 26, respectively 46 at least one lower rim of at least one through bore 42 of disk 32 of body 26, respectively 48 at least one through slit 48 of at least one threader 30, respectively, for allowing removal of at least one fishing line 22 from aid 20 once at least one fishing line 22 has mated with at least one fish hook 24, respectively E. Specific Configuration of at Least One Clip 28

50 pair of sub-clips of each clip of at least one clip 28 for replaceably holding associated fish hook of at least one fish hook 24 by shank 51 of associated fish hook of at least one fish hook 24

51 shank of each fish hook of at least one fish hook 24

51a point of each fish hook of at least one fish hook 24

51b eye of each fish hook of at least one fish hook 24

52 block of each sub-clip of pair of sub-clips 50 of each clip of at least one clip 28

54 through bore of block 52 of each sub-clip of pair of sub-clips 50 of each clip of at least one clip 28

56 lower surface of block 52 of each sub-clip of pair of sub-clips 50 of each clip of at least one clip 28

58 through slot of block 52 of each sub-clip of pair of sub-clips 50 of each clip of at least one clip 28

60 catch tab of each most outward sub-clip of pair of sub-clips 50 of each clip of at least one clip 28

62 cover 64 generally rectangular-shaped cover of cover 62 for replaceably covering points 51a of pair of fish hooks of at least one fish hook 24 engaged in two pair of sub-clips 50 of pair of diametrically opposed clips of at least one clip 28 for safety purposes 66 open top of generally rectangular-shaped cover 64 of cover 62 for facilitating replaceably covering points 51a of pair of fish hooks of at least one fish hook 24 engaged in two pair of sub-clips 50 of pair of diametrically opposed clips of at least one clip 28

68 pair of end walls of generally rectangular-shaped cover 64 of cover 62

70 inner surfaces of pair of end walls 68 of generally rectangular-shaped cover 64 of cover 62, respectively 72 pair of grooves of inner surfaces 70 of pair of end walls 68 of generally rectangular-shaped cover 64 of cover 62, respectively

5. DETAILED DESCRIPTION OF THE PREFERRED EMBODIMENTS

A. Introductory

Referring now to the figures, in which like numerals indicate like parts, and particularly to FIG. 1, which is a diagrammatic perspective view of the aid of the embodiments of the present invention threading at least one fishing line through at least one fish hook, respectively, the aid of the embodiments of the present invention is shown generally at 20 for threading at least one fishing line 22 through at least one fish hook 24, respectively.

B. Overall Configuration of the Aid 20

The overall configuration of the aid 10 can best be seen in FIGS. 2 and 3, which are, respectively, an enlarged diagrammatic perspective view of the aid of the embodiments of the present invention identified by ARROW 2 in FIG. 1, and an enlarged diagrammatic top plan view of the aid of the embodiments of the present invention taken in the direction of ARROW 3 in FIG. 2, and as such, will be discussed with reference thereto.

The aid 20 comprises a body 26, at least one clip 28, and at least one threader 30.

The at least one clip 28 depends from the body 26, and is for replaceably holding the at least one fish hook 24, respectively.

The at least one threader 30 is operatively connected to the body 26, and is for guiding the at least one fishing line 22 through the at least one fish hook 24, respectively, so as to aid threading the at least one fishing line 22 through the at least one fish hook 24, respectively.

C. Specific Configuration of the Body 26

The specific configuration of the body 26 can best be seen in FIGS. 2 and 3, which are, respectively, again, an enlarged diagrammatic perspective view of the aid of the embodiments of the present invention identified by ARROW 2 in FIG. 1, and again, an enlarged diagrammatic top plan view of the aid of the embodiments of the present invention taken in the direction of ARROW 3 in FIG. 2, and as such, will be discussed with reference thereto.

The body 26 is a disk 32.

The disk 32 of the body 26 is thin and flat.

The disk 32 of the body 26 has a periphery 34. The periphery 34 of the disk 32 of the body 26 is a scalloped periphery 36. The scalloped periphery 36 of the periphery 34 of the disk 32 of the body 26 comprises a series of small curves 37.

The disk 32 of the body 26 further has an upper surface 38 and a lower surface 40.

D. Specific Configuration of the at Least One Threader 30

Figure 2:
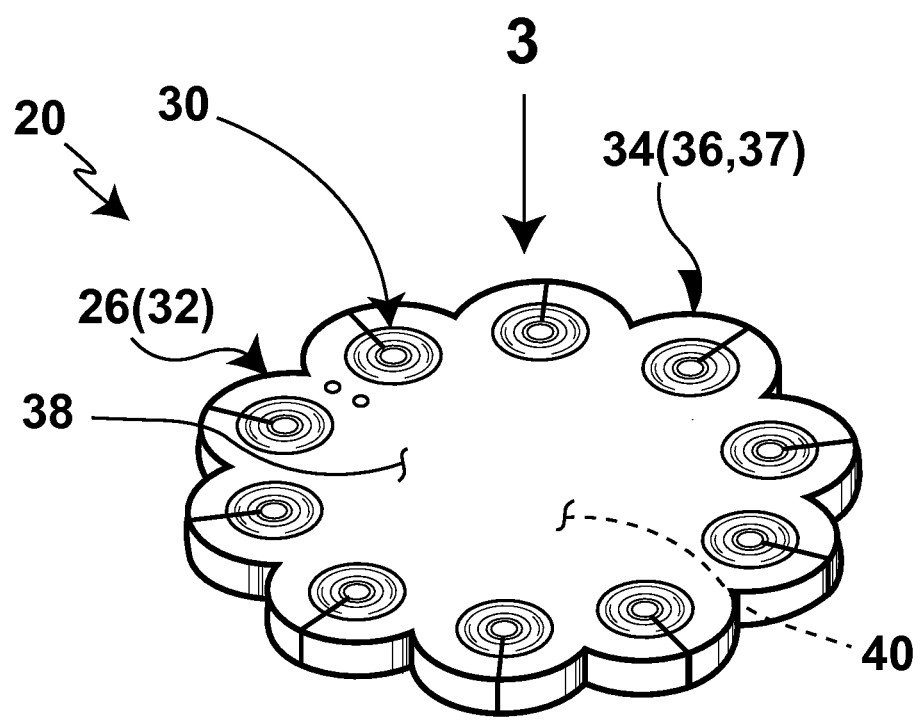
FIG. 2 is an enlarged diagrammatic perspective view of the aid of the embodiments of the present invention identified by ARROW 2 in FIG. 1.

The specific configuration of the at least one threader 30 can best be seen in FIGS. 3, 4, and 4A, which are, respectively, again, an enlarged diagrammatic top plan view of the aid of the embodiments of the present invention taken in the direction of ARROW 3 in FIG. 2, an enlarged diagrammatic cross sectional view taken along LINE 4-4 in FIG. 3 of one portion of the at least one threader of the aid of the embodiments of the present invention, and an enlarged diagrammatic cross sectional view taken along LINE 4A-4A in FIG. 3 of a remaining portion of the at least one threader of the aid of the embodiments of the present invention, and as such, will be discussed with reference thereto.

The at least one threader 30 comprises the disk 32 of the body 26 having at least one through bore 42.

The at least one through bore 42 of the disk 32 of the body 26 is disposed inwardly of an associated small curve 37 of the scalloped periphery 36 of the periphery 34 of the disk 32 of the body 26, extends convergingly from the upper surface 38 of the disk 32 of the body 26 to the lower surface 40 of the disk 32 of the body 26, and is for having the at least one fishing line 22, respectively, pass therethrough during threading.

The at least one through bore 42 of the disk 32 of the body 26 is defined by at least one upper rim 44, respectively.

The at least one upper rim 44 of the at least one through bore 42 of the disk 32 of the body 26, respectively, extends upwardly from the upper surface 38 of the disk 32 of the body 26, circles an associated through bore 42 of the disk 32 of the body 26, and is for facilitating entering the at least one fishing line 22 through the associated through bore 42 of the disk 32 of the body 26.

The at least one through bore 42 of the disk 32 of the body 26 is further defined by at least one lower rim 46, respectively.

The at least one lower rim 46 of the at least one through bore 42 of the disk 32 of the body 26, respectively, extends downwardly from the lower surface 40 of the disk 32 of the body 26, circles an associated through bore 42 of the disk 32 of the body 26, and is smaller than an associated upper rim 44 of an associated through bore 42 of the disk 32 of the body 26 due to each through bore 42 of the disk 32 of the body 26 extending convergingly from the upper surface 38 of the disk 32 of the body 26 to the lower surface 40 of the disk 32 of the body 26.

The at least one threader 30 further comprises at least one through slit 48, respectively.

The at least one through slit 48 of the at least one threader 30, respectively, extends from, and opens into, an associated small curve 37 of the scalloped periphery 36 of the periphery 34 of the disk 32 of the body 26 to, and opens into, an associated through bore 42 of the disk 32 of the body 26, and is for allowing removal of the at least one fishing line 22 from the aid 20 once the at least one fishing line 22 has mated with the at least one fish hook 24, respectively.

E. Specific Configuration of the at Least One Clip 28

Figure 5:
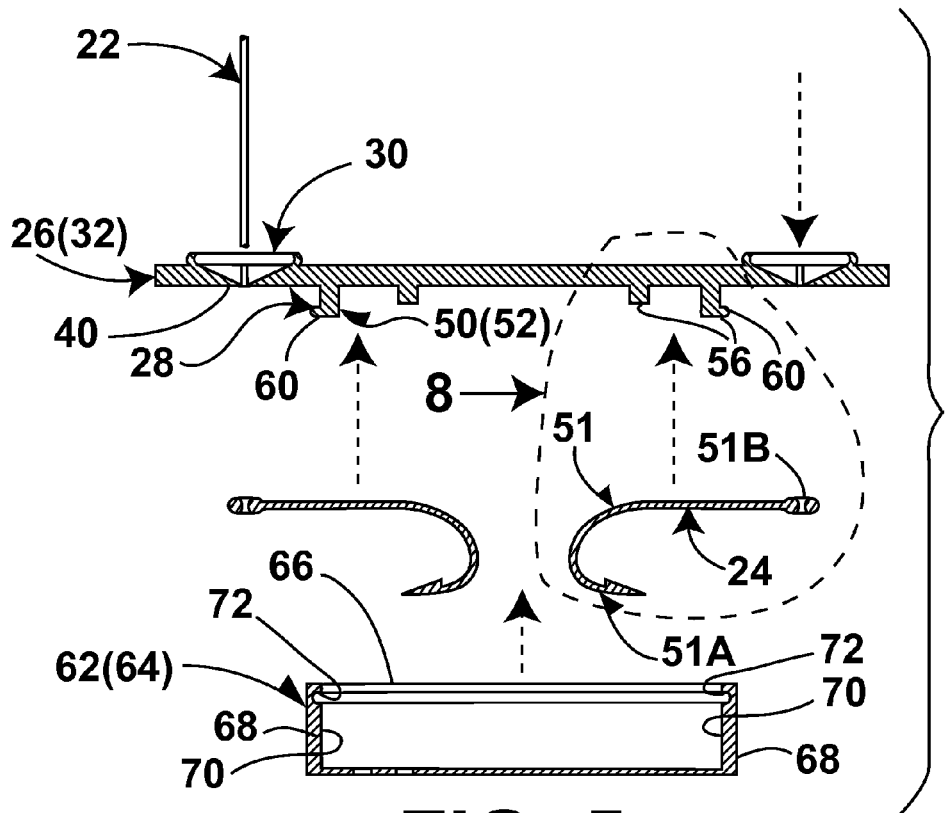
FIG. 5 is an exploded diagrammatic cross sectional view taken along LINE 5-5 in FIG. 1.
Figure 6:
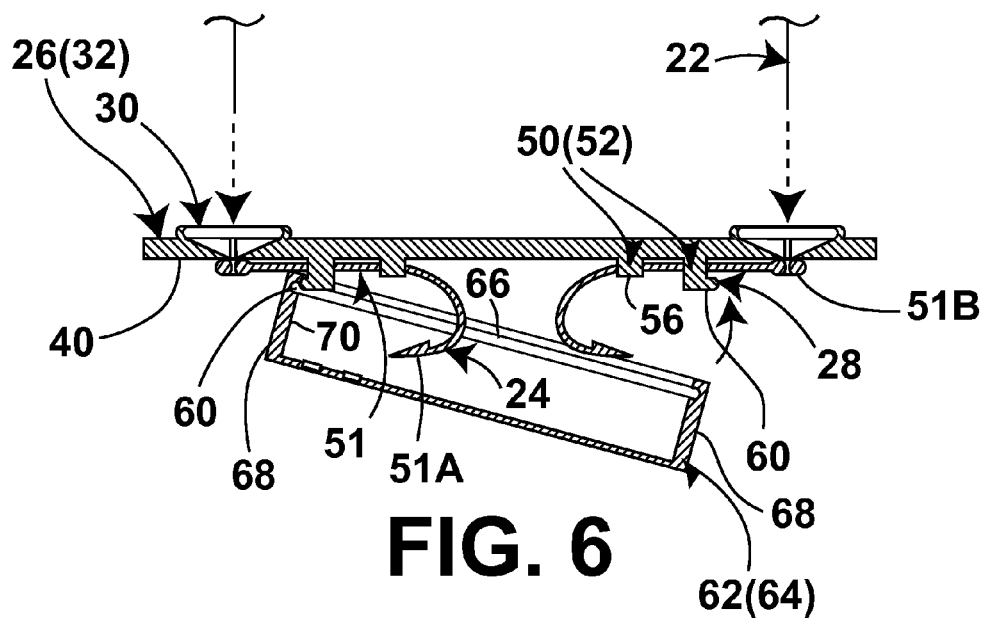
FIG. 6 is a diagrammatic cross sectional view taken along LINE 6-6 in FIG. 1.
Figure 7:
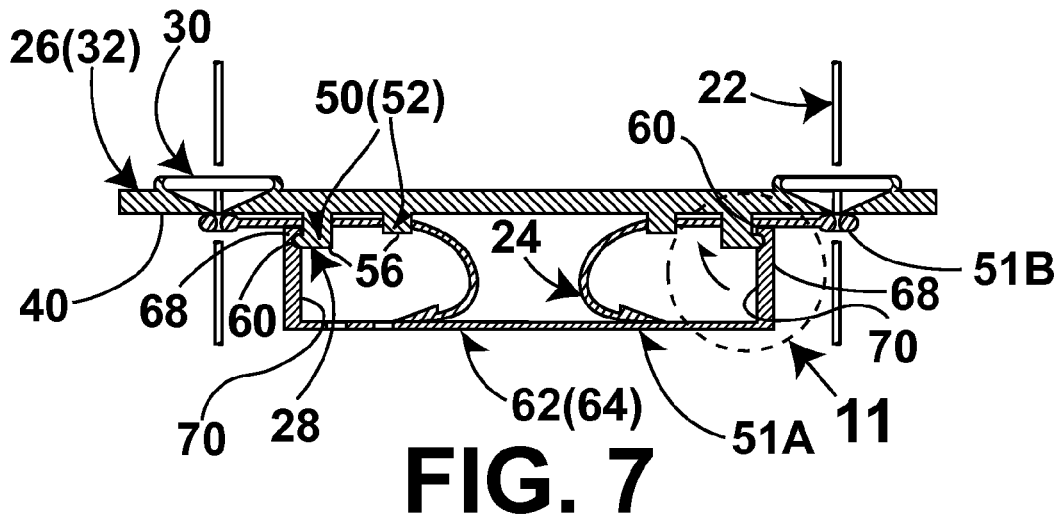
FIG. 7 is a diagrammatic cross sectional view taken along LINE 7-7 in FIG. 1.
Figure 8:
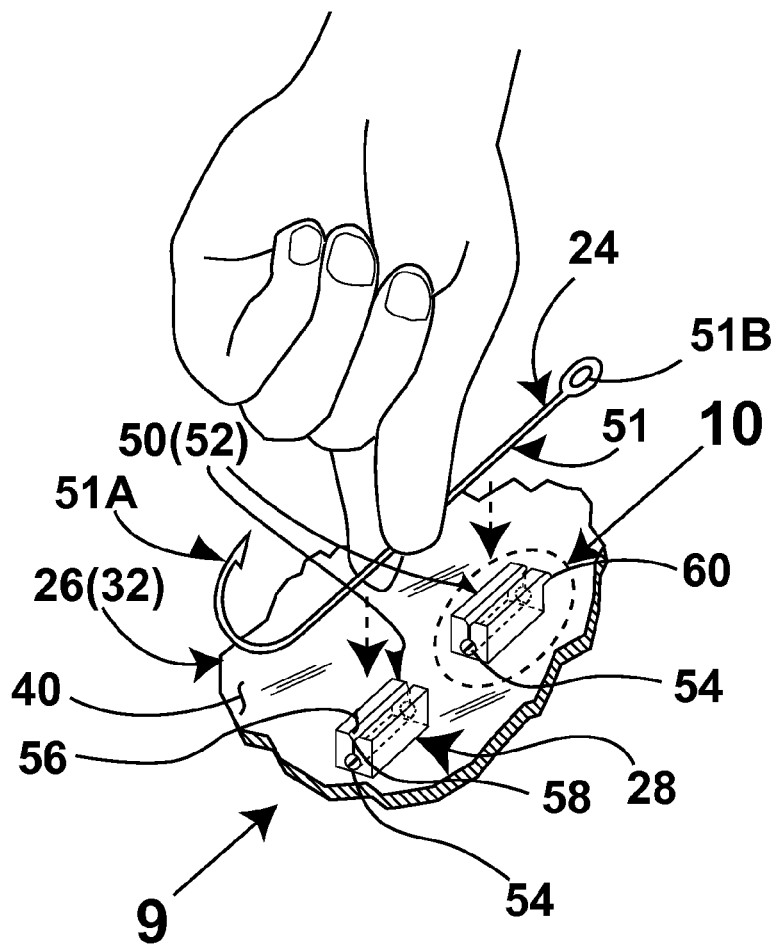
FIG. 8 is an exploded diagrammatic perspective view of the area generally enclosed by the dotted curve identified by ARROW 8 in FIG. 5.
Figure 9:
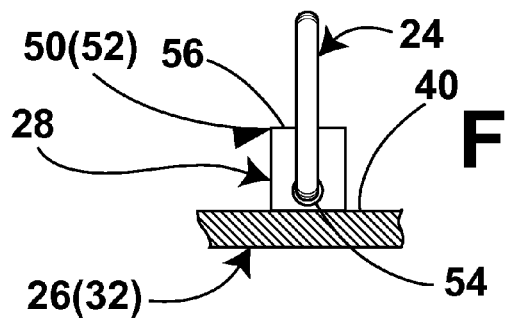
FIG. 9 is an enlarged diagrammatic front end view taken generally in the direction of ARROW 9 in FIG. 8.
Figure 10:
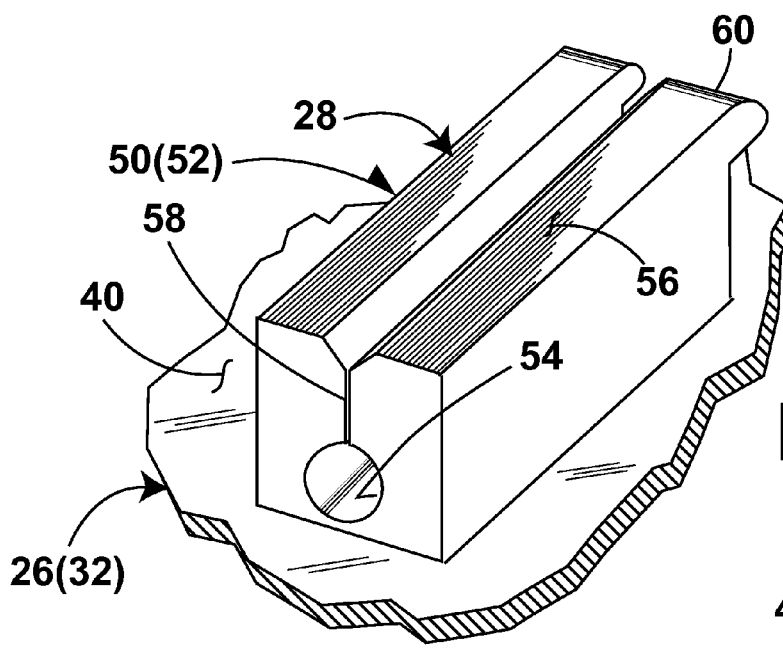
FIG. 10 is an enlarged diagrammatic perspective view of the area generally enclosed by the dotted curve identified by ARROW 10 in FIG. 8 of at least one clip of the aid of the embodiments of the present invention.
Figure 11:
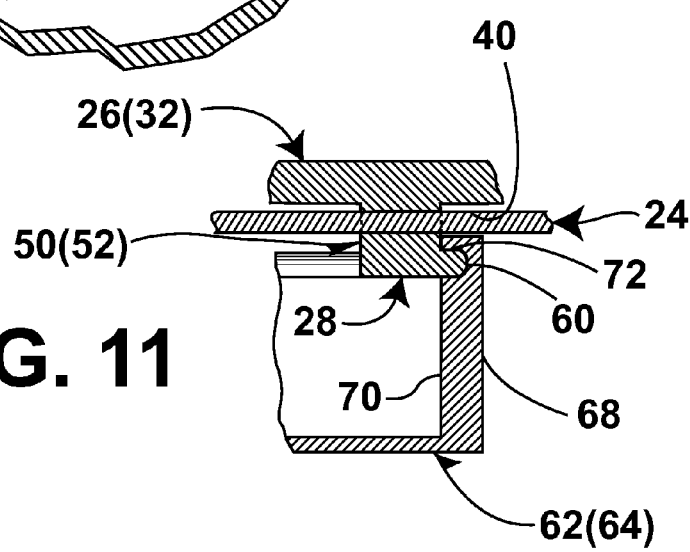
FIG. 11 is an enlarged diagrammatic cross sectional view of the area generally enclosed by the dotted curve identified by ARROW 11 in FIG. 7.

The specific configuration of the at least one clip 28 can best be seen in FIGS. 3, 5, 6, 7, 8, 9, 10, and 11, which are, respectively, again, an enlarged diagrammatic top plan view of the aid of the embodiments of the present invention taken in the direction of ARROW 3 in FIG. 2, an exploded diagrammatic cross sectional view taken along LINE 5-5 in FIG. 1, a diagrammatic cross sectional view taken along LINE 6-6 in FIG. 1, a diagrammatic cross sectional view taken along LINE 7-7 in FIG. 1, an exploded diagrammatic perspective view of the area generally enclosed by the dotted curve identified by ARROW 8 in FIG. 5, an enlarged diagrammatic front end view taken generally in the direction of ARROW 9 in FIG. 8, an enlarged diagrammatic perspective view of the area generally enclosed by the dotted curve identified by ARROW 10 in FIG. 8 of at least one clip of the aid of the embodiments of the present invention, and an enlarged diagrammatic cross sectional view of the area generally enclosed by the dotted curve identified by ARROW 11 in FIG. 7, and as such, will be discussed with reference thereto.

The at least one clip 28 extends radially from the lower surface 40 of the disk 32 of the body 26.

Each clip 28 comprises a pair of sub-clips 50.

The pair of sub-clips 50 of each clip 28 are radially aligned with each other, are disposed inwardly from, and extend towards, an associated threader 30, and are for replaceably holding an associated fish hook 24 by the shank 51 of the associated fish hook 24, with the point 51a of the associated fish hook 24 pointing inwardly, and with the eye 51b of the associated fish hook 24 in alignment with an associated threader 30 so when the fishing line 22 is put through the associated threader 30, the eye 51b of the associated fish hook 24 is right there to receive the fishing line 22 and be threaded.

Each sub-clip 50 of each clip 28 is a block 52.

The block 52 of each sub-clip 50 of each clip 28 is resilient, has a through bore 54 extending axially therethrough, a lower surface 56, and a through slot 58.

The through slot 58 of the block 52 of each sub-clip 50 of each clip 28 extends axially through, and communicates with, the lower surface 56 of an associated sub-clip 50 of each clip 28 to, and communicates with, the through bore 54 in the associated sub-clip 50 of each clip 28.

The through slot 58 of the block 52 of each sub-clip 50 of each clip 28 originates convergingly at the lower surface 56 of an associated sub-clip 50 of each clip 28 for facilitating insertion of an associated fish hook 24 into the associated sub-clip 50 of each clip 28.

Each most outward sub-clip 50 of each clip 28 has a catch tab 60.

The catch tab 60 of each most outward sub-clip 50 of each clip 28 extends forwardly from the lower surface 56 of an associated most outward sub-clip 50 of each clip 28.

The aid 20 further comprises a cover 62.

The cover 62 is a generally rectangular-shaped cover 64.

The generally rectangular-shaped cover 64 of the cover 62 is hollow, and is for replaceably covering the points 51a of a pair of fish hook 24 engaged in two pair of sub-clips 50 of a pair of diametrically opposed clips 28 for safety purposes.

The generally rectangular-shaped cover 64 of the cover 62 has an open top 66. The open top 66 of the generally rectangular-shaped cover 64 of the cover 62 is for facilitating replaceably covering the points 51a of the pair of fish hook 24 engaged in the two pair of sub-clips 50 of the pair of diametrically opposed clips 28.

The generally rectangular-shaped cover 64 of the cover 62 further has a pair of end walls 68. The pair of end walls 68 of the generally rectangular-shaped cover 64 of the cover 62 have inner surfaces 70, respectively. The inner surfaces 70 of the pair of end walls 68 of the generally rectangular-shaped cover 64 of the cover 62, respectively, have a pair of grooves 72, respectively.

The pair of grooves 72 of the inner surfaces 70 of the pair of end walls 68 of the generally rectangular-shaped cover 64 of the cover 62, respectively, are transversely oriented, are disposed just below the open top 66 of the generally rectangular-shaped cover 64 of the cover 62, and detachably receive the catch tab 60 of each most outward sub-clip 50 of the pair of diametrically opposed clips 28, respectively.

F. Impressions

It will be understood that each of the elements described above or two or more together may also find a useful application in other types of constructions differing from the types described above.

While the embodiments of the present invention have been illustrated and described as embodied in an aid for threading at least one fishing line through at least one fish hook, respectively, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. An aid for threading at least one fishing line through at least one fish hook, respectively, wherein each fish hook has a shank, an eye, and a point, said aid comprising:

a) a body;
b) at least one clip; and
c) at least one threader;
wherein said at least one clip depends from said body when said aid is in use;
wherein said at least one clip is for replaceably holding the at least one fish hook, respectively;
wherein said at least one threader is operatively connected to said body; and
wherein said at least one threader is for guiding the at least one fishing line through the at least one fish hook, respectively, so as to aid threading the at least one fishing line through the at least one fish hook, respectively;
wherein each clip comprises a pair of sub-clips; and
wherein said pair of sub-clips of each clip are for replaceably holding an associated fish hook by the shank of the associated fish hook, with the point of the associated fish hook pointing inwardly, and with the eye of the associated fish hook in alignment with an associated threader so when the fishing line is put through an associated threader, the eye of the associated fish hook is aligned to receive the fishing line and be threaded;
wherein each sub-clip of each clip is a block;
wherein said block of each sub-clip of each clip has a through bore extending axially therethrough;
wherein said block of each sub-clip of each clip has a through slot;
wherein said block of each sub-clip of each clip has a lower surface; and
wherein said through slot of said block of each sub-clip of each clip extends axially through, and communicates with, said lower surface of an associated sub-clip of each clip to, and communicates with, said through bore in said associated sub-clip of each clip;
wherein each most outward sub-clip of each clip has a catch tab;
further comprising
a generally rectangular-shaped cover; and
wherein said generally rectangular-shaped cover is for replaceably covering the points of a pair of fish hook engaged in two pair of sub-clips of a pair of diametrically opposed clips for safety purposes.

2. The aid of claim 1, wherein said body is a disk.

3. The aid of claim 2, wherein said disk of said body is thin; and
wherein said disk of said body is flat.

4. The aid of claim 2, wherein said disk of said body has a periphery;
wherein said periphery of said disk of said body is a scalloped periphery; and
wherein said scalloped periphery of said periphery of said disk of said body comprises a series of small curves.

5. The aid of claim 4, wherein said disk of said body has an upper surface; and
wherein said disk of said body has a lower surface.

6. The aid of claim 5, wherein said at least one threader comprises said disk of said body having at least one through bore.

7. The aid of claim 6, wherein said at least one through bore of said disk of said body is disposed inwardly of an associated small curve of said scalloped periphery of said periphery of said disk of said body; and
wherein said at least one through bore of said disk of said body is for having the at least one fishing line, respectively, pass therethrough during threading.

8. The aid of claim 6, wherein said at least one through bore of said disk of said body extends convergingly from said upper surface of said disk of said body to said lower surface of said disk of said body.

9. The aid of claim 6, wherein said at least one through bore of said disk of said body is defined by at least one upper rim, respectively; and
wherein said at least one upper rim of said at least one through bore of said disk of said body, respectively, is for facilitating entering the at least one fishing line through said at least one through bore of said disk of said body, respectively.

10. The aid of claim 9, wherein said at least one upper rim of said at least one through bore of said disk of said body, respectively, extends upwardly from said upper surface of said disk of said body.

11. The aid of claim 9, wherein said at least one upper rim of said at least one through bore of said disk of said body, respectively, circles an associated through bore of said disk of said body.

12. The aid of claim 9, wherein said at least one through bore of said disk of said body is defined by at least one lower rim, respectively.

13. The aid of claim 12, wherein said at least one lower rim of said at least one through bore of said disk of said body, respectively, circles an associated through bore of said disk of said body.

14. The aid of claim 12, wherein said at least one lower rim of said at least one through bore of said disk of said body, respectively, is smaller than an associated upper rim of said at least one through bore of said disk of said body due to said at least one through bore of said disk of said body extending convergingly from said upper surface of said disk of said body to said lower surface of said disk of said body.

15. The aid of claim 6, wherein said at least one threader comprises at least one through slit, respectively; and
wherein said at least one through slit of said at least one threader, respectively, is for allowing removal of the at least one fishing line from said aid once the at least one fishing line has mated with the at least one fish hook, respectively.

16. The aid of claim 15, wherein said at least one through slit of said at least one threader, respectively, extends from, and opens into, an associated small curve of said scalloped periphery of said periphery of said disk of said body to, and opens into, an associated through bore of said disk of said body.

17. The aid of claim 5, wherein said at least one clip extends radially from said lower surface of said disk of said body.

18. The aid of claim 1, wherein said pair of sub-clips of each clip are radially aligned with each other;
wherein said pair of sub-clips of each clip are disposed inwardly from an associated threader; and
wherein said pair of sub-clips of each clip extend towards said associated threader.

19. The aid of claim 1, wherein said block of each sub-clip of each clip is resilient.

20. The aid of claim 1, wherein said through slot of said block of each sub-clip of each clip originates convergingly at said lower surface of an associated sub-clip of each clip for facilitating insertion of an associated fish hook into said associated sub-clip of each clip.

21. The aid of claim 1, wherein said catch tab of each most outward sub-clip of each clip extends forwardly from said lower surface of said block of an associated most outward sub-clip of each clip.

22. The aid of claim 1, wherein said generally rectangular-shaped cover of said cover is hollow.

23. The aid of claim 1, wherein said generally rectangular-shaped cover has an open top; and
   wherein said open top of said generally rectangular-shaped cover is for facilitating replaceably covering the points of the pair of fish hooks engaged in said two pair of sub-clips of said pair of diametrically opposed clips.

24. The aid of claim 23, wherein said generally rectangular-shaped cover of said cover has a pair of end walls;
   wherein said pair of end walls of said generally rectangular-shaped cover of said cover has inner surfaces, respectively;
   wherein said pair of end walls of said generally rectangular-shaped cover of said cover have inner surfaces; and
   wherein said inner surfaces of said pair of end walls of said generally rectangular-shaped cover of said cover have a pair of grooves, respectively.

25. The aid of claim 24, wherein said pair of grooves of said inner surfaces of said pair of end walls of said generally rectangular-shaped cover of said cover, respectively, are transversely oriented;
   wherein said pair of grooves of said inner surfaces of said pair of end walls of said generally rectangular-shaped cover of said cover, respectively, are disposed just below said open top of said generally rectangular-shaped cover of said cover; and
   wherein said pair of grooves of said inner surfaces of said pair of end walls of said generally rectangular-shaped cover of said cover, respectively, detachably receive said catch tab of each most outward sub-clip of a pair of diametrically opposed clips, respectively.

* * * * *